United States Patent [19]

Guttman

[11] 4,072,425
[45] Feb. 7, 1978

[54] METHOD OF INDICATING THE RELATIVE ROUGHNESS OF A SURFACE

[75] Inventor: Thomas Guttman, Philadelphia, Pa.

[73] Assignee: The United States of America as represented by the Secretary of the Army, Washington, D.C.

[21] Appl. No.: 713,069

[22] Filed: Aug. 9, 1976

[51] Int. Cl.² .......................................... G01N 21/48
[52] U.S. Cl. .................................... 356/209; 356/199; 356/200
[58] Field of Search ............... 356/209, 199, 120, 200; 250/57, 562, 572

[56] References Cited

U.S. PATENT DOCUMENTS

| 3,782,836 | 1/1974 | Frey et al. | 356/209 |
| 3,792,930 | 2/1974 | Obenreder | 356/209 |
| 3,850,526 | 11/1974 | Corey | 356/209 |
| 3,922,093 | 11/1975 | Dandliker et al. | 356/120 |
| 3,971,956 | 7/1976 | Jakeman et al. | 356/209 |
| 4,017,188 | 4/1977 | Sawatari | 356/120 |
| 4,019,066 | 4/1977 | Lucas et al. | 250/572 |

Primary Examiner—John K. Corbin
Assistant Examiner—B. W. delos Reyes
Attorney, Agent, or Firm—Nathan Edelberg; Arthur I. Spechler; Robert P. Gibson

[57] ABSTRACT

The relative roughness of a surface, finished with a plurality of uniform parallel grooves, is indicated in a method wherein (a) a focused beam of light is directed normal to the surface, (b) a light-sensitive device is disposed to one side of the beam to receive reflected light of the beam from the surface, (c) relative motion is provided between the beam and the surface, and (d) the energy of the reflected light received by the light-sensitive device is converted to a visual display whose amplitude is a function of the roughness of the surface.

9 Claims, 4 Drawing Figures

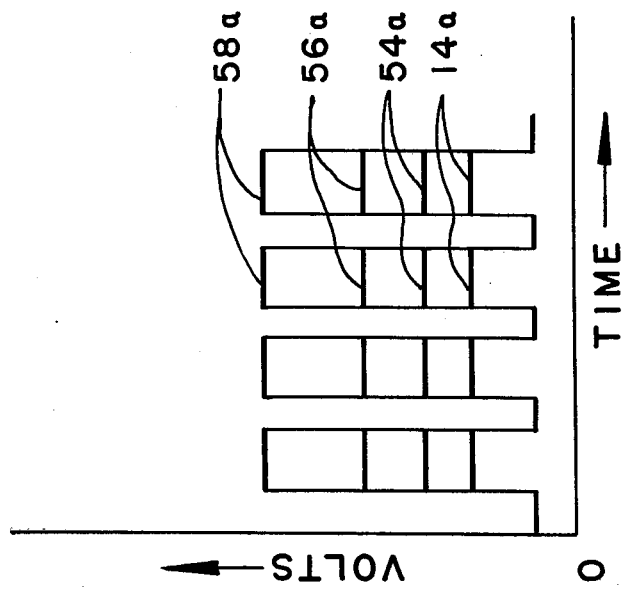
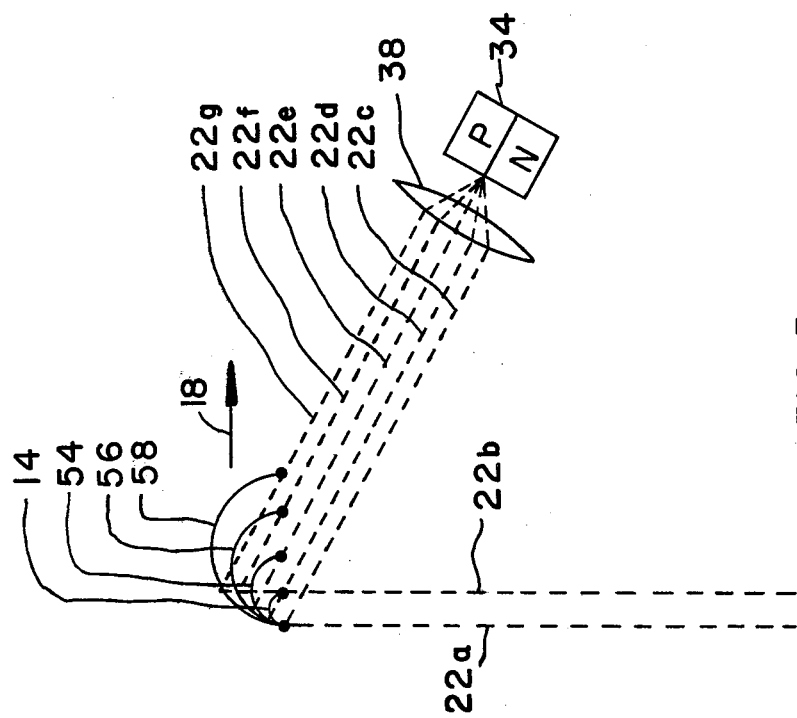

METHOD OF INDICATING THE RELATIVE ROUGHNESS OF A SURFACE

The invention described herein may be manufactured, used and licensed by or for the Government for governmental purposes without the payment to me of any royalty thereon.

BACKGROUND OF THE INVENTION

This invention relates generally to a method of indicating the relative roughness of a surface. More particularly, though not exclusively, the invention relates to a method of indicating the relative roughness of a surface that has been smoothed by machining, as by forming a plurality of substantially uniform and parallel grooves therein. The invention is particularly useful for indicating the relative roughness of the finished surfaces of projectile casings because excessive roughness can interfere with the proper operation of the projectiles.

The standards of relative roughness, as used herein, are those of the Standard Surface Finish Blocks (S.S.F.B.) standardized by the National Bureau of Standards. The Standard Surface Finish Blocks are designated by numbers, as for example, 32, 64, 125, 250, and 500. The smaller the S.S.F.B. number is, the smoother is the surface it designates.

It has been proposed to indicate the relative roughness of a finished surface by magnifying the surface and visually comparing it with reference surfaces, but such a method is obviously slow and subject to human error. Instruments for measuring the roughness of commercial finishes are usually of the tracer type in which a finely pointed diamond stylus is drawn across the finished surface. The motion of the stylus is highly magnified and recorded by electrical means. While satisfactory for certain materials, the aforementioned instruments may mar the very smooth finish surfaces they are measuring.

Where high-dimensional accuracy and smooth surface finishes are required, bar stock metals, for example, are usually finished by machining, as with a milling machine. These finished surfaces appear smooth to the naked eye, but they actually consist of a plurality of substantially uniform and parallel grooves formed by regularly spaced cuts with a cutting tool.

SUMMARY OF THE INVENTION

Briefly stated, the novel method, in one embodiment thereof, of indicating the relative roughness of a surface, finished with a plurality of substantially uniform parallel grooves, utilizes a focused beam of light directed substantially perpendicularly to the finished grooved surface. A light-sensitive device is disposed laterally of the incident beam to receive reflected light of the beam from the surface. The received light energy is converted to a voltage, and visual means are provided to indicate the degree of roughness of the finished surface as a function of the amplitude of the voltage.

In another embodiment of the novel method, the beam of light is provided by a laser source. The laser beam is interrupted periodically to reduce the effect of ambient alternating current. A semiconductor diode is employed for the light-sensitive device, and an oscilloscope is used for the visual output means. The beam of light is preferably focused to a width of the narrowest groove that represents the least roughness to be indicated.

DESCRIPTION OF THE DRAWINGS

The novel features of the invention, as well as the invention itself, both as to its organization and its method of operation, will be understood form the accompanying drawings, taken in connection with the accompanying description, in which like reference characters refer to like parts, and in which:

FIG. 3 is a schematic functional diagram for explaining the theory of operation of the novel method; and FIG. 4 is a series of square waves as they would appear on the face of an oscilloscope to indicate the relative degrees of roughness of different finished surfaces.

DESCRIPTION OF THE PREFERRED EMBODIMENT

Figure 1:
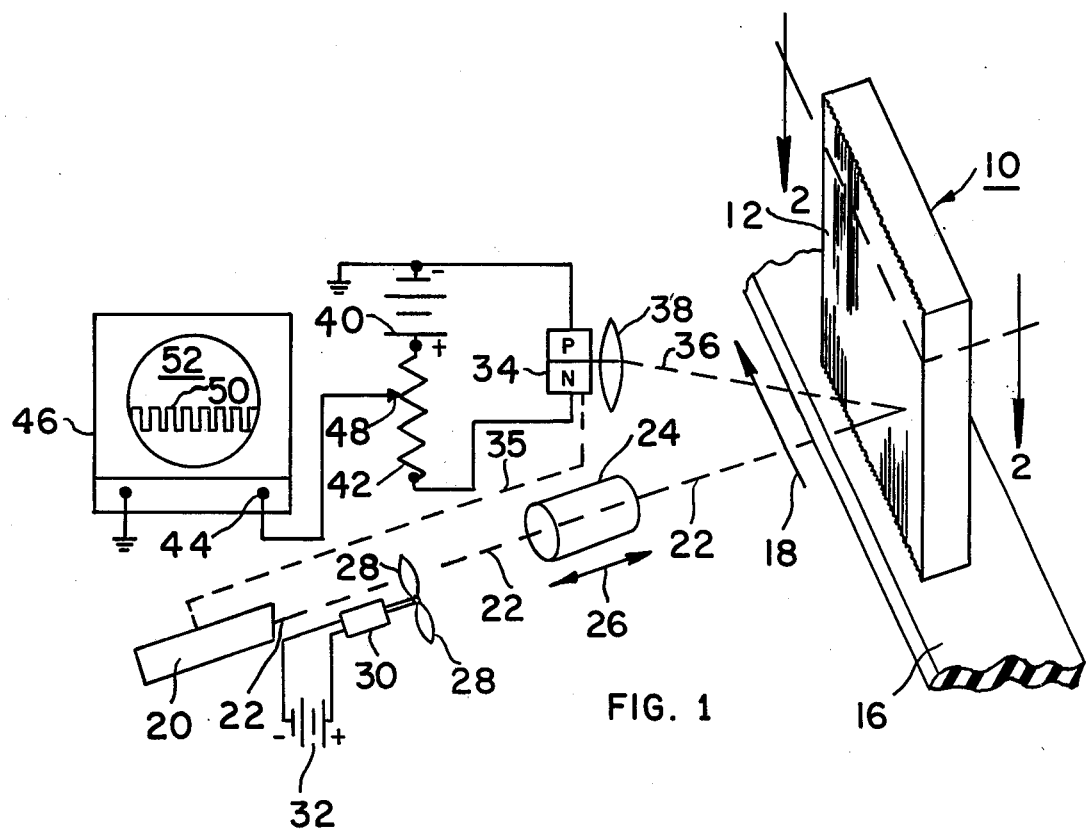
FIG. 1 is a perspective drawing, partly schematic and partly fragmentary, of a block of metal in the process of having the relative roughness of a finished surface thereof indicated.

Referring now to FIG. 1 of the drawing, there is shown an object 10, such as a block of brass, for example, the relative roughness of whose surface 12 it is desired to indicate. The surface 12 has been finished (smoothed) by machining, as by a milling machine, and consists of a plurality of substantially uniform parallel grooves 14, as shown in the enlarged cross-sectional view of the surface 12 in FIG. 2. While the overall surface 12 (ignoring the grooves 14 therein) is illustrated herein as a substantially planar surface, it may also be curved (with grooves therein) in accordance with the novel method.

The object 10 is placed on a belt 16 that is adapted to be moved, by any suitable means (not shown) in a direction indicated by arrow 18, for the purpose hereinafter appearing. The movement of the object 10 is in a direction transverse to that of the grooves 14 at a substantially constant speed. Preferably, the object 10 should be moved in a direction that is substantially perpendicular to the direction of the parallel grooves 14.

In accordance with the novel method, a light source 20 is disposed to direct an incident beam 22 of light substantially normal (perpendicular) to the finished surface 12. The light source 20 may be either of the laser or non-laser type, but a laser source of relatively low energy output is preferred because of safety precautions. The light source 20, for example, may be a continuous wave HeNe 5mW laser source, or the like.

Figure 2:
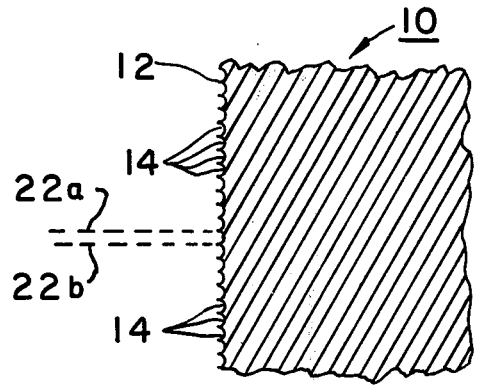
FIG. 2 is an enlarged fragmentary cross-sectional view of the block shown in FIG. 1, taken along the line 2-2 and viewed in the direction indicated by the arrows.

An optical system 24, comprising one or more movable lenses, is disposed in the path of the incident beam 22 for focusing the beam 22 with a desirable width onto the finished surface 12. The optical system 24 is schematically illustrated in FIG. 1 with two lenses and is adjustable for focusing purposes by movement in the directions indicated by the double-headed arrow 26. In operation, the width of the beam 22 is focused (with the aid of a magnifier, not shown) onto the finished surface 12 so that its width at the surface 12 is substantially that of the narrowest groove 14 that indicates the least roughness to the indicated. Hence, as shown in FIG. 2, the width of the beam 22 is illustrated by the distance between the dashed lines 22a and 22b. The latter (focusing) adjustment is suitable in the novel method for indicating the relative roughness of finished surfaces with a roughness equal to, or greater than, that of a surface finished with grooves of the width of the grooves 14.

Means to interrupt the incident beam 22 periodically are disposed in the path of the beam 22 to reduce alternating-current interference on the beam 22 that may be caused by an AC light source 20. To this end, the blades 28 of a fan 30 are disposed to interrupt the beam 22 periodically when energized by a suitable unidirectional source 32 of voltage. The periodic interruption of the beam 22 also makes it possible to use an AC indicating instrument for indicating roughness, as will hereinafter be explained.

A light-sensitive device 34, such as a photocell or a semiconductor diode, for example, is disposed to one side of the incident beam 22 to receive light from a reflected beam 36 resulting from the incident beam 22 impinging on the finished surface 12. Preferably, a lens 38 is disposed in front of the device 34 to focus the reflected beam 36 onto the PN-junction of the device 34. The device 34 is disposed to one side of the incident beam 22, and fixed with respect to the light source 20, as indicated by the dotted line 35, for the purpose hereinafter appearing.

The light-sensitive device 34 is connected in a series electrical circuit with a suitable voltage source 40, such as a battery, and a resistor 42. The negative terminal of the voltage source 40 is connected to a common connection, such as ground. The current flowing in the series circuit will be proportional to the light energy received by the light-sensitive device 34.

Means to indicate the amount of current flowing in the series circuit, as a function of the quantity of light received by the device 34 can be provided by indicating the voltage across the resistor 42. To this end the input terminal 44 of the vertical sweep of an oscilloscope 46 is connected to a tap 48 on the resistor 42. Thus, the amplitude of the voltage at the tap 48 can be visualized by the vertical height of the oscilloscope trace 50 on the face 52 of the oscilloscope 46, in a manner well known in the art.

The operation of the novel method of indicating the relative roughness of a finished surface, formed with a plurality of substantially uniform and parallel grooves, will now be explained with the aid of FIGS. 1 and 2. Let it be assumed that it is desired to indicate the relative roughness of the finished surface 12 of the object 10 with respect to the standard finished surface of an S.S.F.B. No. 32. The incident beam 22 of light is focused with the optical system 24 so that its width at the surface 12 (as may be observed with a magnifier) is the width of the groove of an S.S.F.B. No. 32. If the object 10 in FIG. 2 were as S.S.F.B. No. 32, the width of the focused beam 22 would be that between the dotted lines 22a and 22b. The fan 30 is started, and relative motion between the surface 12 and the light-sensitive device 34 ( and the light source 20) is provided. This relative motion can be easily provided by moving the belt 16 in the direction of the arrow 18 at a relatively constant rate of a few inches per second. The speed is not critical.

Reflected light, via the reflected beam 36, from the finished surface 12 impinges on the light-sensitive device 34, and current in proportion to the intensity of the light received by the device 34 flows in the circuit including the resistor 42. The voltage drop across the resistor 42 is proportional to the current through it and provides the trace 50 on the face 52 of the oscilloscope 46. The amplitude of the square-wave trace 50 is related to the relative degree of roughness of the surface.

The theory of operation of the novel method will now be explained with the aid of FIGS. 3 and 4. In FIG. 3, let the semi-circular contours 14, 54, 56, and 58 (as seen in cross-section) represent the contours of the grooves in S.S.F.B. Nos. 32, 64, 250, and 500, respectively. Let it also be desired to indicate the relative roughness of the S.S.F.B. Nos. 32, 64, 250, and 500 with respect to the S.S.F.B. No. 32. The beam 22 is focused to the width of the narrowest groove 14 (the groove of the S.S.F.B. No. 32). This width is indicated in FIG. 3 by the distance between the dashed lines 22a and 22b. The incident beam 22 (represented as 22a and 22b in FIG.3) is directed substantially perpendicularly to the longitudinal direction of the groove 14. It is now observed that the reflected light received by the light-sensitive device 34 from the groove 14 is a beam whose thickness is between the dashed lines 22c and 22d. The reflected light, however, received by the device 34 from the grooves 54, 56, and 58 are beams between the dashed lines 22c-22e, 22c-22f, and 22c-22g, respectively. Thus, the wider the groove is, the more light is reflected to, and received by, the light-sensitive device 34. When the (S.S.F.B.) blocks are individually moved in the direction of the arrow 18, each block will provide a separate characteristic square-wave response (trace), on the oscilloscope face 52, whose amplitude is a function of the roughness of the finished surface to be indicated. The rougher the finished surface is, the greater the amplitude of the oscilloscope trace will be. The traces (square waves) 14a, 54a, 56a, and 58a in FIG. 4 are representative of the relative roughnesses of S.S.F.B. Nos. 32, 64, 250, and 500, as indicated by the finished surfaces with uniform the parallel grooves 14, 54, 56, and 58, respectively, shown in FIG. 3.

While there has been described a preferred embodiment of the novel method of indicating the relative roughness of a finished surface, it will be obvious to those skilled in the art that various changes and modifications may be made therein without departing from the spirit of the invention. For example, relative motion between the finished surface and the incident and reflected beams of light may be obtained by moving the light source and the light-sensitive device (fixed with respect to the light source) while maintaining the finished surface stationary. Also, an AC voltage indicating instrument may be used, instead of the oscilloscope, for the visual indicating means because the indicating voltage is a pulsed (interrupted) one.

Thus, there has been provided a novel method of indicating the relative roughness of a surface that has the advantages over the prior art of being relatively faster, more accurate, substantially free from human error, and eliminating the possibility of marring the surface finish.

What is claimed is:

1. A method of indicating the relative roughness of a surface finished with a plurality of substantially uniform parallel grooves, said method comprising the steps of:
    directing an incident beam of light substantially perpendicularly to said surface,
    interrupting said incident beam periodically,
    focusing said beam so that its width at said surface is substantially that of the narrowest groove that represents the least roughness to be indicated, providing a light-sensitive device disposed laterally of said beam to received reflected light of said beam from said surface, providing relative motion between said surface and said beam in a direction substantially perpendicular to the direction of said grooves, and converting the energy of said reflected light received by said device to a visual display, whereby to indicate the relative roughness of said surface.

2. A method of indicating the relative roughness of a surface as described in claim 1, including the additional step of:

focusing said reflected light onto said light-sensitive device.

3. A method of indicating the relative roughness of a surface as described in claim 1, wherein:

said surface is finished with a milling maching, whereby to provide said substantially uniform parallel grooves therein.

4. A method of indicating the relative roughness of a surface as described in claim 1, wherein:

said beam of light is provided by a laser-beam source.

5. A method of indicating the relative roughness of a surface as described in claim 1, wherein:

the step of focusing said beam comprises disposing an adjustable optical system in the path of said incident beam.

6. A method of indicating the relative roughness of a surface as described in claim 1, wherein:

the step of providing a light-sensitive device disposed to receive reflected light of said beam from said surface comprises placing said device at a fixed distance from the source of said incident beam and to one side of said incident beam.

7. A method of indicating the relative roughness of a surface as described in claim 1, wherein:

the step of providing relative motion between said surface and said beam comprises moving said surface in a direction transversely to the direction of said grooves while maintaining said beam and said device stationary.

8. The method of indicating the relative roughness of a surface as described in claim 1, wherein:

the step of converting the energy of said reflected light received by said device to a visual display comprises connecting said device in an electrical circuit to convert said energy to a voltage, and providing said circuit with means to indicate the amplitude of said voltage.

9. The method of indicating the relative roughness of a surface, as indicated in claim 8, wherein said means to indicate the amplitude of said voltage is an oscilloscope.

* * * * *